J. F. McELROY.
ELECTRIC SWITCH.
APPLICATION FILED SEPT. 16, 1909.

1,075,986.

Patented Oct. 14, 1913.

Witnesses
L. T. Shaw
J. L. Traiteler

Inventor
James F. McElroy
by E. M. Bentley
Atty

UNITED STATES PATENT OFFICE.

JAMES F. McELROY, OF ALBANY, NEW YORK, ASSIGNOR TO CONSOLIDATED CAR-HEATING COMPANY, A CORPORATION OF WEST VIRGINIA.

ELECTRIC SWITCH.

1,075,986.   Specification of Letters Patent.   Patented Oct. 14, 1913.

Application filed September 16, 1909. Serial No. 517,959.

*To all whom it may concern:*

Be it known that I, JAMES F. MCELROY, a citizen of the United States, residing at Albany, county of Albany, State of New York, have invented certain new and useful Improvements in Electric Switches, the following being a full, clear, and exact disclosure of the one form of my invention which I at present deem preferable.

For a detailed description of the present form of my invention, reference may be had to the following specification and to the accompanying drawings forming a part thereof, in which—

Figure 1:
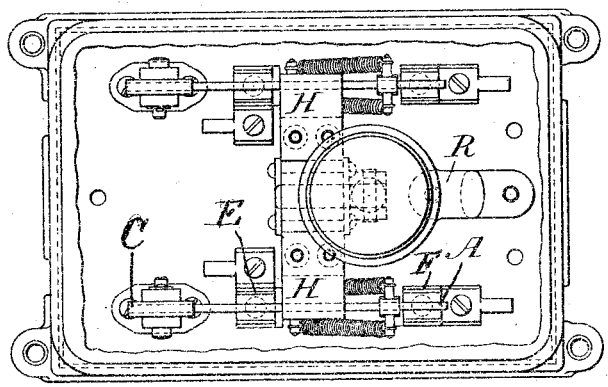
Figure 2:
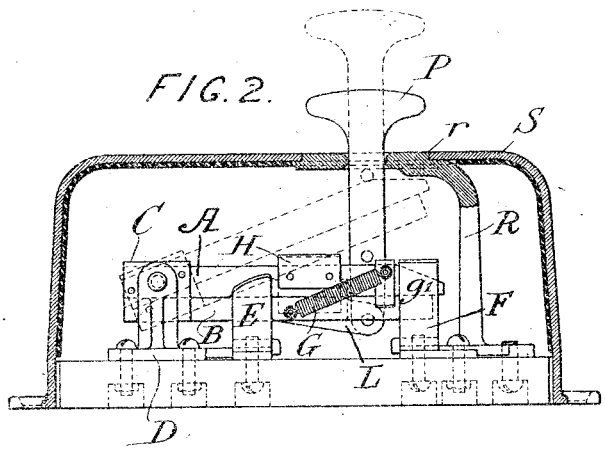
Figure 3:
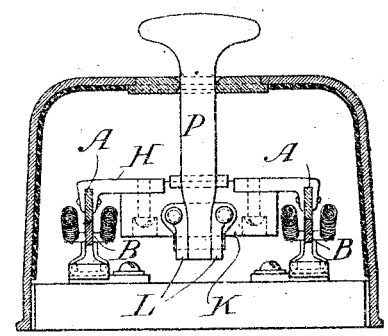

Figure 1 is a plan view of my switch with the inclosing case removed. Fig. 2 is a longitudinal section thereof, and Fig. 3 a transverse section.

My invention relates to an electric switch particularly designed for use in the cabs of electric railway cars to control an electric heater in the cab, the heater being connected in series with other heaters in the body of the car and provided with a short-circuiting connection including my switch. Thus the heater is put into circuit by opening the switch, while the closing of the switch short circuits it and renders it inactive.

My switch is of the knife-blade type and each blade is composed of two parallel spring-connected jaws pivoted together at one end. Both blades act together as a single switch-blade, both entering the receiving clip and connecting electrically therewith, while the operating handle is attached to the outer blade so that, in opening the switch, the outer blade is first drawn out of the clip by the handle and the second blade follows by reason of the pull of the spring which connects the two blades. I employ a pair of such switch blades to make up a double-pole switch, the two upper blades being cross connected by an insulating block to which the operating handle is connected, the handle being of considerable length, since the surrounding casing must be deep enough to permit the necessary range of throw of the switch blades.

To guide the handle I provide a special guide-standard mounted on the base and having at its upper end a circular opening or eye through which the handle passes and outside of which the switch casing is fitted. By this means the bearings for the switch handle are independent of the casing and the latter may be removed for inspection without disturbing the said handle or its connection with the switch mechanism.

Referring to the accompanying drawing, each switch plate is shown as composed of two blades A and B. The two blades at the heel end are embraced by a clip C riveted to the outer blade A and pivoted to the inner blade B, while the heel pivot of the blade passes through the said clip and through the upper blade A. D is the heel bearing in which the blade is pivoted and E, F are the receiving clips serving as the circuit terminals which are to be connected by means of the blade. The two blades are also connected on each side by diagonal springs G, each attached at one end to the outer blade A near the toe, and at the opposite end to the lower blade B at a point near the heel of the blade. To the upper edge of each outer blade A is pivoted a bracket H projecting transversely from the upper blade toward the opposite jaw and attached to an insulating block K. On the forward side of the block K are attached the ears L between which is pivoted at its lower end the handle P. The said handle extends upward and passes through an eye or opening in the overhanging portion of the guiding standard R. The eye portion of this standard has a shoulder r which projects through an opening in the external casing S so that its outer surface is flush with the outside surface of the casing. The standard R is separately attached to the insulating face A and the casing S is provided with an insulating lining.

The operation of the switch is by a push and pull movement. If the switch is closed, as shown by the full lines in Fig. 2, the handle B will be pulled outward, drawing with it the outer blades A. The outer blades will be first pulled away from the clip F and lifted to about the position shown by dotted lines, when the strain on the springs G which connect the outer and inner blades will become sufficient to pull the inner blades too away from the clip, the said inner blades taking such arcing as may occur on the rupture of the short circuit around the heater, it being understood that the entire current for all the heaters in the car will be passing through this short circuit. The reverse operation closes the switch, the handle B pushing both blades together into the clip and the outer jaw A, which is not subjected to arcing, will insure a good electrical contact between the blade and the clip.

What I claim as new and desire to secure by Letters Patent is:

1. An electric switch comprising a pair of parallel blades, an inwardly projecting lateral bracket carried by each blade, an insulating block connecting the brackets, a pair of forwardly projecting ears carried by the block, and a handle pivotally connected to the ears.

2. An electric switch comprising blades, laterally projecting brackets carried thereby, insulating means connecting the brackets, and an operating handle pivotally connected to the insulating means.

3. An electric switch comprising a base, supports carried thereby, a pair of switch blades pivotally connected to each support, each pair of blades including an upper blade and a lower blade, brackets carried by the upper blades, an insulating connection for the brackets, and an operating handle pivotally connected to the insulating connection.

4. An electric switch comprising a base, supports carried thereby, a pair of blades, each pair of blades including an upper blade and a lower blade, a bracket carried by each upper blade, an insulating connection between the brackets, a handle pivotally connected to the connection, a clip carried by each pair of blades, said clips being rigidly fastened to the upper blades and pivotally fastened to the lower blade, means for pivotally connecting the clips and the upper blades to the supports, and a resilient connection between the upper and lower blades.

In witness whereof I have hereunto set my hand before two subscribing witnesses, this 13th day of September, 1909.

JAMES F. McELROY.

Witnesses:
BEULAH CARLE,
JOHN M. ESTERLY.